(12) United States Patent
Montagne

(10) Patent No.: US 12,549,532 B2
(45) Date of Patent: Feb. 10, 2026

(54) CRYPTOGRAPHIC AUTHENTICATION OF COMPONENTS IN AN ELECTRIC VESSEL

(71) Applicant: VISION MARINE TECHNOLOGIES, Boisbriand (CA)

(72) Inventor: Xavier Montagne, Laval (CA)

(73) Assignee: VISION MARINE TECHNOLOGIES, Boisbriand (CA)

( * ) Notice: Subject to any disclaimer, the term of this patent is extended or adjusted under 35 U.S.C. 154(b) by 113 days.

(21) Appl. No.: 18/644,961

(22) Filed: Apr. 24, 2024

(65) Prior Publication Data

US 2025/0337719 A1 Oct. 30, 2025

(51) Int. Cl.
*H04L 9/40* (2022.01)
*H04L 12/40* (2006.01)

(52) U.S. Cl.
CPC .............. *H04L 63/08* (2013.01); *H04L 12/40* (2013.01); *H04L 63/0428* (2013.01); *H04L 2012/40215* (2013.01); *H04L 2012/40273* (2013.01)

(58) Field of Classification Search
CPC ..... H04L 63/08; H04L 12/40; H04L 63/0428; H04L 2012/40215; H04L 2012/40273
See application file for complete search history.

(56) References Cited

U.S. PATENT DOCUMENTS

| | | | |
|---|---|---|---|
| 7,389,412 B2* | 6/2008 | Sharma | H04L 63/061 713/153 |
| 8,037,319 B1* | 10/2011 | Clifford | H04L 9/0894 713/193 |
| 9,231,936 B1* | 1/2016 | Wang | H04L 63/12 |
| 10,372,935 B1* | 8/2019 | Mwaura | G06F 16/2379 |
| 10,594,510 B1* | 3/2020 | Arbuckle | H04L 43/0847 |
| 10,917,440 B1* | 2/2021 | Reddy | H04L 63/0471 |
| 10,972,401 B1* | 4/2021 | Kirchhoff | H04L 12/40032 |
| 10,999,260 B1* | 5/2021 | Silvestri | H04L 9/0894 |
| 11,831,786 B1* | 11/2023 | Ratts | G06F 21/572 |
| 11,870,768 B1* | 1/2024 | Vishwakarma | H04W 8/26 |
| 12,395,471 B2* | 8/2025 | Pese | H04L 63/0428 |
| 12,424,038 B1* | 9/2025 | Rogers | F41C 27/00 |
| 2003/0126455 A1* | 7/2003 | Sako | H04N 5/913 713/193 |
| 2003/0167394 A1* | 9/2003 | Suzuki | H04L 63/0428 713/168 |
| 2004/0184614 A1* | 9/2004 | Walker | H04H 60/23 380/270 |
| 2005/0005093 A1* | 1/2005 | Bartels | H04L 63/0428 713/150 |
| 2006/0078120 A1* | 4/2006 | Mahendran | H04L 63/164 380/255 |

(Continued)

*Primary Examiner* — Aravind K Moorthy

(57) ABSTRACT

According to embodiments of the present disclosure, various methods, apparatuses, and computer program products for cryptographic authentication of components in an electric vessel are described herein. In some aspects, a first device of a plurality of vessel powertrain components receives a first authentication message from a second device of the plurality of vessel powertrain components via a control area network. The first device identifies, based on the first authentication message, an encryption key, a cleartext message, and an encrypted message. The first device authenticates, using the first encryption key, the second device based on the first cleartext message and the first encrypted message.

20 Claims, 13 Drawing Sheets

(56) References Cited

U.S. PATENT DOCUMENTS

| | | | |
|---|---|---|---|
| 2007/0223701 A1* | 9/2007 | Emeott | H04L 63/065 380/270 |
| 2008/0065890 A1* | 3/2008 | Lundsgaard | H04W 12/033 713/171 |
| 2009/0075630 A1* | 3/2009 | Mclean | H04L 63/0428 455/410 |
| 2009/0169007 A1* | 7/2009 | Vasicheck | E02F 9/205 380/255 |
| 2010/0067697 A1* | 3/2010 | Casati | H04W 12/02 380/278 |
| 2011/0055564 A1* | 3/2011 | Porsch | H04L 9/3236 713/168 |
| 2011/0093639 A1* | 4/2011 | Richards | H04L 63/126 710/310 |
| 2012/0281839 A1* | 11/2012 | Arnold | H04L 9/0897 380/277 |
| 2013/0238581 A1* | 9/2013 | Franzki | G06F 21/6209 707/705 |
| 2014/0351593 A1* | 11/2014 | Anson | H04L 63/0428 713/168 |
| 2014/0359277 A1* | 12/2014 | McGrew | H04L 63/0245 713/153 |
| 2015/0312763 A1* | 10/2015 | Pang | H04W 12/06 713/171 |
| 2015/0381367 A1* | 12/2015 | Zarcone | H04L 9/3218 |
| 2017/0013005 A1* | 1/2017 | Galula | H04L 63/1425 |
| 2017/0222828 A1* | 8/2017 | Six | H04L 61/5038 |
| 2017/0279776 A1* | 9/2017 | Tsao | H04L 9/0643 |
| 2017/0295182 A1* | 10/2017 | Teshler | H04L 51/212 |
| 2017/0302452 A1* | 10/2017 | Nanjundappa | B60R 16/023 |
| 2018/0083982 A1* | 3/2018 | Asenjo | H04L 63/0428 |
| 2018/0109622 A1* | 4/2018 | Galula | H04W 84/005 |
| 2018/0167393 A1* | 6/2018 | Walrant | H04L 63/101 |
| 2018/0234843 A1* | 8/2018 | Smyth | H04W 12/03 |
| 2018/0331824 A1* | 11/2018 | Racz | G08B 13/19667 |
| 2019/0036689 A1* | 1/2019 | Schiffman | H04L 9/0861 |
| 2019/0103960 A1* | 4/2019 | Viswanathan | H04L 63/101 |
| 2019/0140828 A1* | 5/2019 | Wheeler | H04L 9/3242 |
| 2019/0173862 A1* | 6/2019 | Kim | H04L 9/083 |
| 2019/0191020 A1* | 6/2019 | Hamada | H04L 63/1466 |
| 2019/0200225 A1* | 6/2019 | Fitzgibbon | H04W 12/06 |
| 2019/0223010 A1* | 7/2019 | Keränen | H04W 80/12 |
| 2019/0268145 A1* | 8/2019 | Barth | H04L 9/0838 |
| 2019/0318346 A1* | 10/2019 | Ben-David | H04L 9/006 |
| 2019/0342080 A1* | 11/2019 | Vakili | H04L 63/06 |
| 2020/0015072 A1* | 1/2020 | Hillan | H04W 12/47 |
| 2020/0076777 A1* | 3/2020 | Sipcic | H04L 67/562 |
| 2020/0134234 A1* | 4/2020 | LeMay | G06F 21/602 |
| 2020/0186558 A1* | 6/2020 | McShane | H04L 43/50 |
| 2020/0250325 A1* | 8/2020 | Chong | G06F 21/6218 |
| 2020/0380326 A1* | 12/2020 | Kawaguchi | H04B 1/401 |
| 2020/0396211 A1* | 12/2020 | Dobbins | H04L 63/08 |
| 2021/0029147 A1* | 1/2021 | McCanty | H04W 12/009 |
| 2021/0092603 A1* | 3/2021 | Yang | H04L 9/0844 |
| 2021/0203504 A1* | 7/2021 | Brandt | G06F 21/755 |
| 2021/0218561 A1* | 7/2021 | Kim | H04L 9/0838 |
| 2021/0344700 A1* | 11/2021 | Ueno | G06F 21/552 |
| 2021/0357914 A1* | 11/2021 | Silvestri | H04L 9/0825 |
| 2021/0385089 A1* | 12/2021 | Burgin | H04W 4/40 |
| 2022/0046114 A1* | 2/2022 | Entelis | H04L 69/04 |
| 2022/0053325 A1* | 2/2022 | Hu | H04W 12/043 |
| 2022/0067651 A1* | 3/2022 | Kawaguchi | G06Q 10/0833 |
| 2022/0130182 A1* | 4/2022 | Stavrou | B63B 79/30 |
| 2022/0131834 A1* | 4/2022 | Kleine | H04W 4/40 |
| 2022/0174051 A1* | 6/2022 | Wang | H04L 63/205 |
| 2022/0200970 A1* | 6/2022 | Singh | H04L 63/06 |
| 2022/0200971 A1* | 6/2022 | Vigneswaran | H04L 63/061 |
| 2022/0215693 A1* | 7/2022 | Burger | H04L 12/40 |
| 2022/0242367 A1* | 8/2022 | Kato | G07C 9/00309 |
| 2022/0266707 A1* | 8/2022 | Treadway | B60L 53/16 |
| 2022/0269264 A1* | 8/2022 | Corbett | B60W 30/18072 |
| 2023/0073618 A1* | 3/2023 | Johnston | H04L 12/40104 |
| 2023/0300120 A1* | 9/2023 | Cheng | H04L 63/045 713/171 |
| 2023/0305988 A1* | 9/2023 | Fukuno | G06F 13/4282 |
| 2023/0353544 A1* | 11/2023 | Mueller | H04L 63/123 |
| 2024/0022406 A1* | 1/2024 | Yan | H04L 51/214 |
| 2024/0214843 A1* | 6/2024 | Zheng | H04L 43/10 |
| 2024/0296254 A1* | 9/2024 | Askerov | G06F 21/76 |
| 2024/0333758 A1* | 10/2024 | Bernath | H04L 63/1458 |
| 2024/0422150 A1* | 12/2024 | Peddada | H04L 9/0863 |
| 2025/0133398 A1* | 4/2025 | Tsai | H04W 12/10 |
| 2025/0193181 A1* | 6/2025 | Thambidurai | H04L 63/18 |

* cited by examiner

CRYPTOGRAPHIC AUTHENTICATION OF COMPONENTS IN AN ELECTRIC VESSEL

FIELD OF THE TECHNOLOGY

The present disclosure relates to methods, apparatus, and products for cryptographic authentication of components in an electric vessel.

BACKGROUND

Advances in battery technology have paved the way for full-electric vehicles. Building on those advances, technology to enable full-electric watercraft has been widely adopted. However, the challenges of designing electric vehicles are different from the challenges of designing electric boats. The transformation of existing watercraft platforms to a full-electric platform also poses a different set of challenges. A particular challenge faced by electric watercraft is the danger of inoperable components. For example, a boat owner may attempt to use a battery or outboard motor that is not designed for operation with a particular electric boat. Such inoperability can cause the battery to overheat, catch fire, and even explode.

SUMMARY

According to embodiments of the present disclosure, various methods, apparatuses, and computer program products for cryptographic authentication of components in an electric vessel are described herein. In some aspects, a first device of a plurality of vessel powertrain components receives a first authentication message from a second device of the plurality of vessel powertrain components via a control area network. The first device identifies, based on the first authentication message, an encryption key, a cleartext message, and an encrypted message. The first device authenticates, using the first encryption key, the second device based on the first cleartext message and the first encrypted message.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Advances in battery technology have paved the way for full-electric vehicles. Building on those advances, technology to enable full-electric watercraft has been widely adopted. However, the challenges of designing electric vehicles are different from the challenges of designing electric boats. The transformation of existing watercraft platforms to a full-electric platform also poses a different set of challenges. A particular challenge faced by electric watercraft is the danger of inoperable components. For example, a boat owner may attempt to use a battery or outboard motor that is not designed for operation with a particular electric boat. Such inoperability can cause the battery to overheat, catch fire, and even explode.

To ensure that only genuine components are used in the vessel, cryptographic authentication messages are exchanged among the components. Each genuine component may be encoded with a private key that is shared by genuine components. In an authentication exchange, a cleartext message is transmitted with an encrypted message. If the encrypted message is encrypted using the private key, and is therefore genuine, this will be indicated by encrypting the cleartext message or decrypting the encrypted message to validate the data in the authentication message. To guard against key breaking, only a portion of the cleartext message and encrypted message can be transmitted. An encoding/decoding mechanism provided within genuine components will allow components to reconstruct a message from only a portion of the message.

Figure 1A:
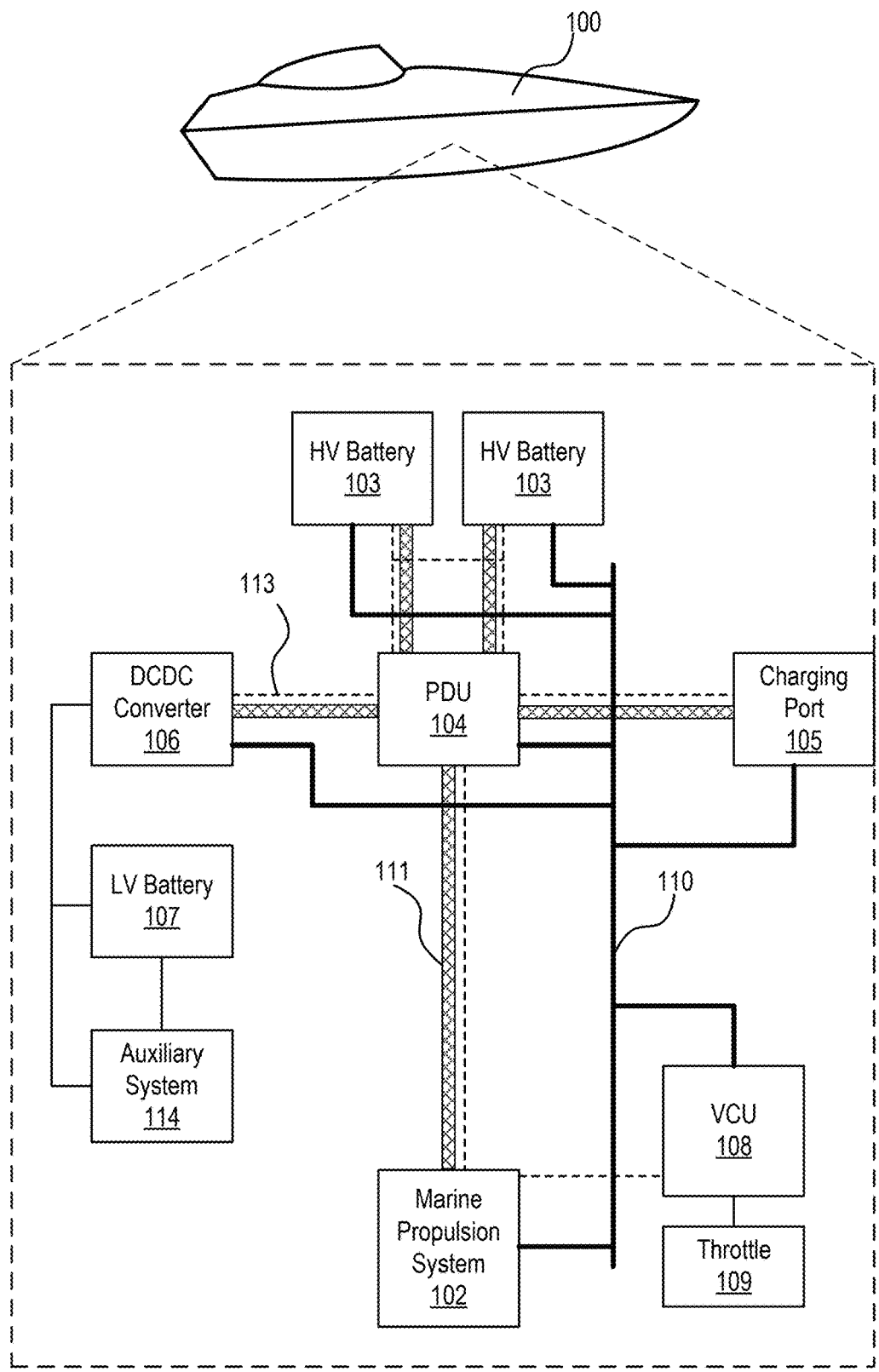
FIG. 1A sets forth a block diagram of an example vessel for cryptographic authentication of components in an electric vessel in accordance with at least one embodiment of the present disclosure.

FIG. 1A sets forth an example electric vessel 100 for cryptographic authentication of components in an electric vessel in accordance with the present disclosure. FIG. 1A is provided to emphasize the powertrain components of vessel 100. It will be appreciated that vessel 100 may include other components not shown or described herein. Vessel 100 may be any type of watercraft. In a particular example, vessel 100 includes a full-electric powertrain and thus may also referred to as an 'electric boat.' To that end, vessel 100 includes a marine propulsion system 102. For example, marine propulsion system 102 may be a full-electric outboard motor or inboard motor with a propeller, or a full-electric jet craft with an impeller. The marine propulsion system is described in more detail below with reference to FIG. 1B.

The marine propulsion system 102 is powered by one or more high voltage batteries 103. In the example, of FIG. 1A, two high voltage batteries 103 are shown; however, it will be appreciated a vessel 100 in accordance with the present disclosure may include fewer or more high voltage batteries. High voltage batteries operate at voltages ranging from a few hundred to over 800 volts, depending on the design and application. Higher voltages allow for more efficient power transmission and reduced current flow, which helps minimize energy losses. Each high voltage battery 103 includes multiple modules, each containing several individual battery cells connected in series and parallel configurations to achieve the desired voltage and capacity. These cells may be arranged in a pack that optimizes space utilization and facilitates thermal management. Each high voltage battery 103 includes or is coupled to a battery management system (BMS). The BMS is responsible for monitoring and controlling various parameters such as voltage, current, temperature, and state of charge (SoC) of individual cells within the pack. The BMS helps optimize battery performance, protect against overcharging or over-discharging, and ensures safety. The BMS communicates with other vessel components about battery state, receives commands to change the battery state, and controls the opening and closing of the main contactors in the battery. The high voltage battery 103 is described in more detail below with reference to FIG. 1C.

The marine propulsion system 102 receives power from the high voltage battery 103 via a power distribution unit (PDU) 104. The PDU 104 receives high-voltage DC power from the high voltage batteries 103 and routes it to different subsystems and components within vessel 100, such as the electric marine propulsion system 102 and other subsystems such as a DCDC converter 106. The PDU 104 also couples the high voltage batteries 103 to a charging port 105 for charging the high voltage batteries 103. The PDU 104, as explained in more detail below with reference to FIG. 1D, includes a set of contactors that are controlled by logic or software in the PDU 104 to ensure safety when switching the flow of power among various vessel components.

The DCDC converter 106 provides voltage conversion capabilities to step down the high-voltage DC power to lower voltages required by an auxiliary system 114, such as the 12-volt electrical system used for lights, accessories, and onboard electronics. The DCDC converter 106 may be used to charge a lower voltage battery such as a 12-volt marine battery 107.

Vessel 100 further includes a vessel control unit 108. Vessel control unit 108 serves as the central control unit responsible for managing and coordinating various functions and systems onboard the vessel 100. For example, the vessel control unit 108 can provide propulsion control, including regulating engine speed, torque, and direction to achieve desired propulsion performance and maneuverability in accordance with commands or signals received from the vessel's throttle control 109. The vessel control unit 108 can also manage the vessel's steering system. The vessel control unit 108 can also control startup/shut down routines, control charging/operation mode selection, control the opening and closing of contactors in the PDU 104, monitor the state of onboard systems, perform vessel diagnostics, and interface with an operator dashboard. To that end, the vessel control unit 108 may communicate with the other vessel powertrain components (e.g., the marine propulsion system 102, the high voltage battery 103, the PDU 104, the DCDC converter 106, and so one) via a control area network (CAN), referred to herein as a CAN bus 110. The vessel control unit 108 will be described in more detail below with reference to FIG. 1E.

The CAN bus 110 may be a two-wire serial bus that allows multiple components and devices within a vessel to communicate with each other without a host computer. The CAN bus 110 may use a message-based communication scheme where components and devices send and receive data in the form of messages. Each message includes a CAN identifier (CAN ID), data bytes, and control bits. The CAN bus 110 may employ a multi-master architecture, in that any device on the network can initiate a message transmission. This distributed architecture allows for efficient communication between vessel components without the need for a centralized controller. In a particular example, the CAN bus 110 may implement the NMEA2000 protocol, a standard set forth by the National Marine Electronics Association. NMEA2000 provides optimization and messaging for a marine environment.

Vessel 100 can also include a high voltage interlock loop (HVIL) system, which is a safety feature designed to ensure the safe operation and maintenance of the high-voltage components. HVIL is a dedicated circuit that ensures the high voltage connectors are well inserted in the equipment mating connector to ensure the safety of the high voltage connections. HVIL is used by the high voltage battery BMS and the vessel control unit 108 to confirm the integrity of these connections before applying high voltage energy to each high voltage device in the vessel.

For ease of reference, in FIG. 1A power interconnects 111 supplying high voltage power are shown in hash-filled lines, data interconnects for CAN bus 110 are shown in thick solid black lines, and HVIL interconnects 113 are shown in dashed lines.

Figure 1B:
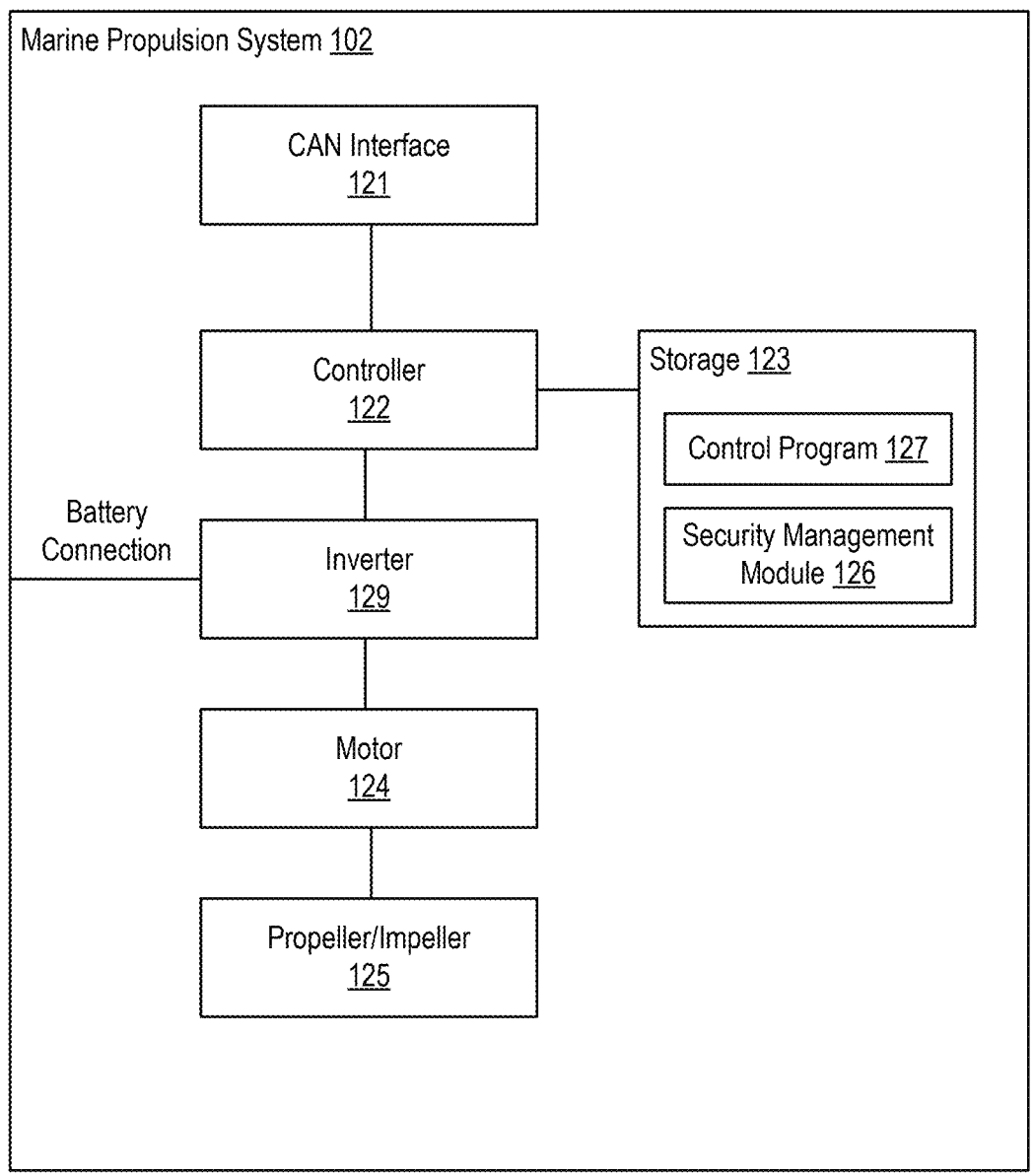
FIG. 1B sets forth a block diagram of an example marine propulsion system for cryptographic authentication of components in an electric vessel in accordance with at least one embodiment of the present disclosure.

For further explanation, FIG. 1B sets forth a block diagram of an example of the electric marine propulsion system 102 in accordance with at least one embodiment of the present disclosure. The example marine propulsion system 102 of FIG. 1B includes a CAN interface 121 for coupling the marine propulsion system 102 to the CAN bus 110. For example, the CAN interface 121 may be a network interface controller configured to send and receive messages in the form of CAN frames over the CAN bus 110.

The example marine propulsion system 102 also includes a controller 122 coupled to the CAN interface 121. The controller 122 may include or implement a processor, a microcontroller, an Application Specific Integrated Circuit (ASIC), a programmable logic array (PLA) such as a field programmable gate array (FPGA), or other data processing unit in accordance with the present disclosure. In some examples, the controller is implemented by a processor or central processing unit configured to execute computer programming instructions, also referred to a computer executable instructions or processor executable instruction. Such instruction can be loaded from and stored in one or more memory devices collectively referred to as storage 123. Storage 123 may include electrically erasable programmable read-only memory (EEPROM) such as Flash memory (e.g., NAND and NOR flash memory or other types of solid-state memory), dynamic random-access memory (DRAM), static RAM (SRAM), magnetic disk storage, and the like. The storage 123 may be integrated with the controller 122 or provided as a separate memory device coupled to the controller 122.

The marine propulsion system 102 also includes an inverter 129 that that is powered by the high voltage batteries 103. The inverter 129 functions to convert the DC current received from the high voltage batteries 103 to alternating current (AC) that can be used by an electric motor. In some examples, the inverter 129 is a high voltage two-phase DC to a high voltage three-phase AC converter. The marine propulsion system also includes an electric motor 124 coupled to a propeller/impeller 125. The electric motor 124 is powered by the current received from the inverter 129. The electric motor 124 is an electric traction motor that turns a drive shaft (not shown) that drives the propeller/impeller 125. In some examples, the electric motor is a permanent magnet electric motor. The electric motor 124 is designed to withstand exposure to water and corrosive marine environments, featuring waterproof enclosures, sealed bearings, and corrosion-resistant materials to ensure reliable operation in wet conditions. The electric motor 124 operates quietly, producing minimal noise and vibration compared to traditional combustion engines, which contributes to a quieter boating experience as well as reduced noise pollution in aquatic environments. The electric motor 124 offers high efficiency and energy density, allowing electric boats to achieve comparable performance to traditional boats powered by combustion engines while using less energy and producing fewer emissions.

A control program 127 embodied in computer programing instructions is stored within tangible persistent storage of storage 123. When executed by the controller 122, the control program 127 is configured to receive commands from the vessel control unit 108 and control the electric motor 124 in accordance with those commands. For example, the control program 127 may be configured to regulate the distribution of electrical energy from the inverter 129 to the electric motor 124. In this example, the control program 127 may receive a throttle/speed command from the vessel control unit 108 and determine the frequency variation or voltage variation that will enter the electric motor 124 for controlling the vessel's speed. The control program 127 is further configured to receive motor state information from various sensors (not shown) and supply motor state information and diagnostic information to the vessel control unit 108. Also stored in tangible persistent storage of storage 123 is a security management module 126. Aspects of the security management module 126 will be described in greater detail below.

Figure 1C:
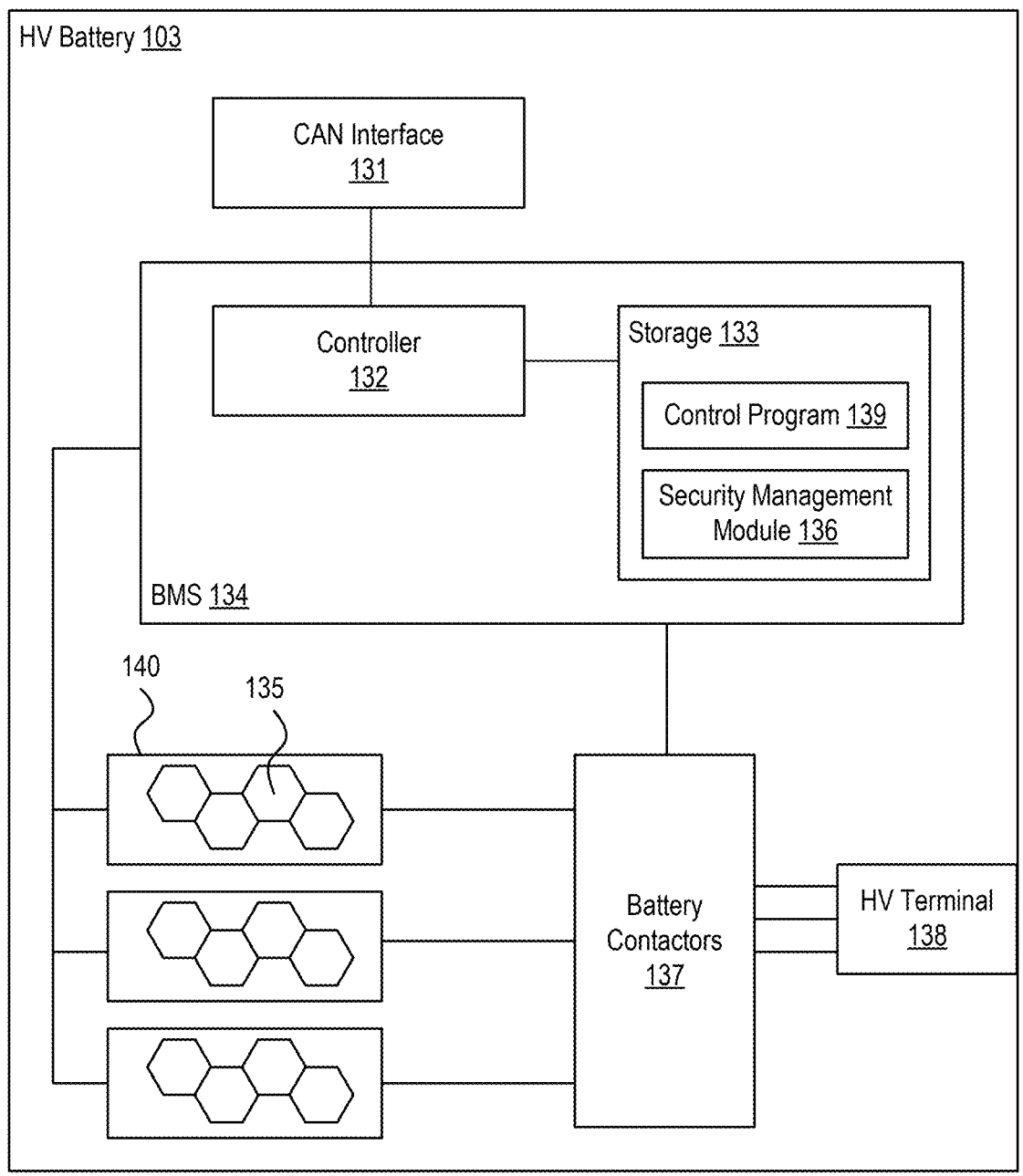
FIG. 1C sets forth a block diagram of an example high voltage battery for cryptographic authentication of components in an electric vessel in accordance with at least one embodiment of the present disclosure.

For further explanation, FIG. 1C sets forth a block diagram of an example of the high voltage battery 103 in accordance with at least one embodiment of the present disclosure. The example high voltage battery 103 of FIG. 1C includes a CAN interface 131 for coupling the high voltage battery 103 to the CAN bus 110. For example, the CAN interface 131 may be a network interface controller configured to send and receive messages in the form of CAN frames over the CAN bus 110. The example high voltage battery 103 includes array of battery cells 135 organized into battery modules 140 or battery packs, and a set of battery contactors 137 that selectively couple the battery modules 140 to high voltage terminals 138 of the battery 103.

The example high voltage battery 103 also includes a battery management system (BMS) 134 comprising a controller 132 coupled to the CAN interface 131. Controller 132 may include or implement a processor, a microcontroller, an ASIC, PLA such as an FPGA, or other data processing unit in accordance with the present disclosure. In some examples, controller 132 is implemented by a processor or central processing unit configured to execute computer programming instructions, also referred to a computer executable instructions or processor executable instruction. Such instructions can be loaded from and stored in one or more memory devices collectively referred to as storage 133. Storage 133 may include EEPROM such as Flash memory (e.g., NAND and NOR flash memory or other types of solid-state memory), DRAM, SRAM, magnetic disk storage, and the like. The battery management system 134 further includes a variety of sensors (not shown) coupled to battery cells for measuring battery state information. The storage 133 may be integrated with the controller 132 or provided as a separate memory device coupled to the controller 132.

The BMS 134 includes a control program 139 embodied in computer programing instructions stored in tangible persistent storage of storage 133. In some examples, the control program 139 controls the state of the battery contactors for selectively coupling and decoupling the battery modules 140 to the high voltage terminals 138 of the battery 103. In some examples, the control program 139 also monitors battery state information such as voltage, current, and temperature in battery cells 135 via the above-mentioned sensors. In some examples, the control program 139 also communicates with the vessel control unit 108 to provide battery state information. The control program also controls the charging of the battery cells 135. BMS 134 further includes a security management module 136 stored in tangible persistent storage of storage 133. Aspects of the security management module 136 will be described in greater detail below.

Figure 1D:
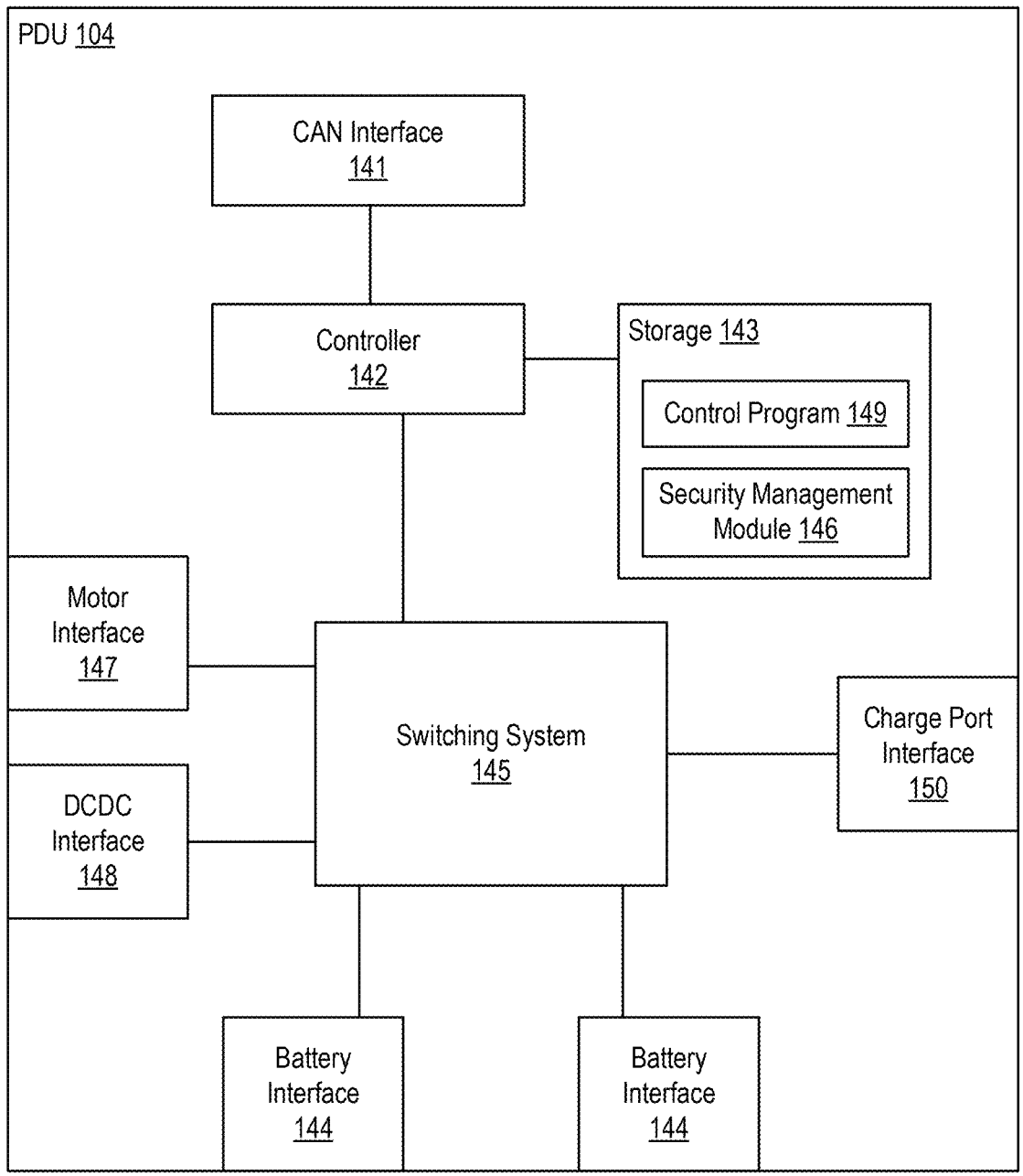
FIG. 1D sets forth a block diagram of an example power distribution unit for cryptographic authentication of components in an electric vessel in accordance with at least one embodiment of the present disclosure.

For further explanation, FIG. 1D sets forth a block diagram of an example of the PDU 104 in accordance with at least one embodiment of the present disclosure. The example PDU 104 of FIG. 1D includes a CAN interface 141 for coupling the PDU 104 to the CAN bus 110. For example, the CAN interface 141 may be a network interface controller configured to send and receive messages in the form of CAN frames over the CAN bus 110. The PDU 104 also includes a battery interface 144 coupling the high voltage batteries 103 to a switching system 145 of the PDU 104, a charge port interface 150 coupling the charging port 105 to the switching system 145, a motor interface 147 coupling the marine propulsion system 102 to the switching system 145, and a DCDC interface 148 coupling the DCDC converter 106 to the switching system 145. The switching system 145 includes a set of contactors (not shown for simplicity) by which the PDU 104 supplies power from the high voltage batteries 103 to the marine propulsion system 102 and to the DCDC converter 106, or supplies power from the charging port 105 to the high voltage batteries 103.

The example PDU 104 also includes a controller 142 that may include or implement a processor, a microcontroller, an ASIC, PLA such as an FPGA, or other data processing unit in accordance with the present disclosure. In some examples, the controller 142 is implemented by a processor or central processing unit configured to execute computer programming instructions, also referred to a computer executable instructions or processor executable instruction. Such instructions can be loaded from and stored in one or more memory devices collectively referred to as storage 143. Storage 143 may include EEPROM such as Flash memory (e.g., NAND and NOR flash memory or other types of solid-state memory), DRAM, SRAM, magnetic disk storage, and the like. The storage 143 may be integrated with the controller 142 or provided as a separate memory device coupled to the controller 122.

The PDU 104 also includes a control program 149 embodied in computer programing instructions stored in tangible persistent storage of storage 143. When executed by the controller 142, the control program 149 is configured to receive commands from the vessel control unit 108 and control the switching system 145 to connect and disconnect power supplied to vessel components. The control program 149 is also configured to provide state information to vessel control unit 108. Also stored in tangible persistent storage is a security management module 146. Aspects of the security management module 146 will be described in more detail below.

Figure 1E:
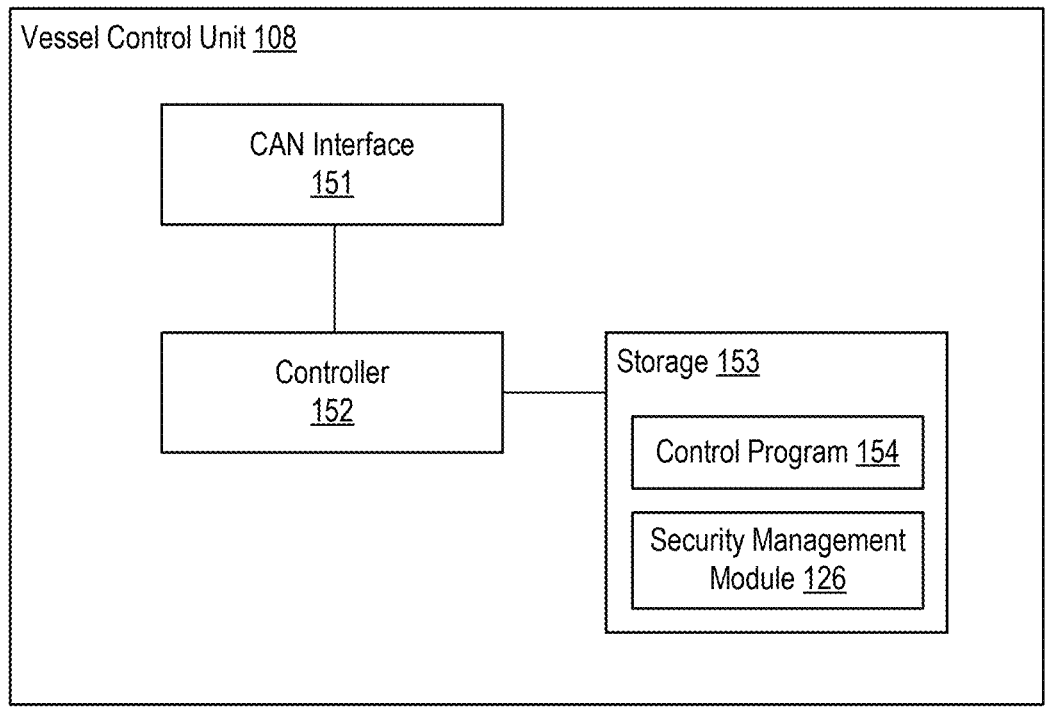
FIG. 1E sets forth a block diagram of an example vessel control unit for cryptographic authentication of components in an electric vessel in accordance with at least one embodiment of the present disclosure.

For further explanation, FIG. 1E sets forth a block diagram of an example of vessel control unit 108 in accordance with at least one embodiment of the present disclosure. The example vessel control unit 108 of FIG. 1E includes a CAN interface 151 for coupling the vessel control unit 108 to the CAN bus 110. For example, the CAN interface 151 may be a network interface controller configured to send and receive messages in the form of CAN frames over the CAN bus 110.

The example vessel control unit 108 also includes a controller 152 that may include or implement a processor, a microcontroller, an ASIC, PLA such as an FPGA, or other data processing unit in accordance with the present disclosure. In some examples, controller 152 is implemented by a processor or central processing unit configured to execute computer programming instructions, also referred to a computer executable instructions or processor executable instruction. Such instructions can be loaded from and stored in one or more memory devices collectively referred to as storage 153. Storage 153 may include EEPROM such as Flash memory (e.g., NAND and NOR flash memory or other types of solid-state memory), DRAM, SRAM, magnetic disk storage, and the like. The storage 153 may be integrated with the controller 152 or provided as a separate memory device coupled to the controller 152.

The vessel control unit 108 also includes a control program 154 embodied in computer programing instructions stored in tangible persistent storage of storage 153. When executed by controller 152, the control program 154 is configured to send commands to other vessel components and receive state information and diagnostic data from vessel components as discussed above. Also stored in tangible persistent storage is a security management module 126. Aspects of the security management module 126 will be described in greater detail below.

Figure 2A:
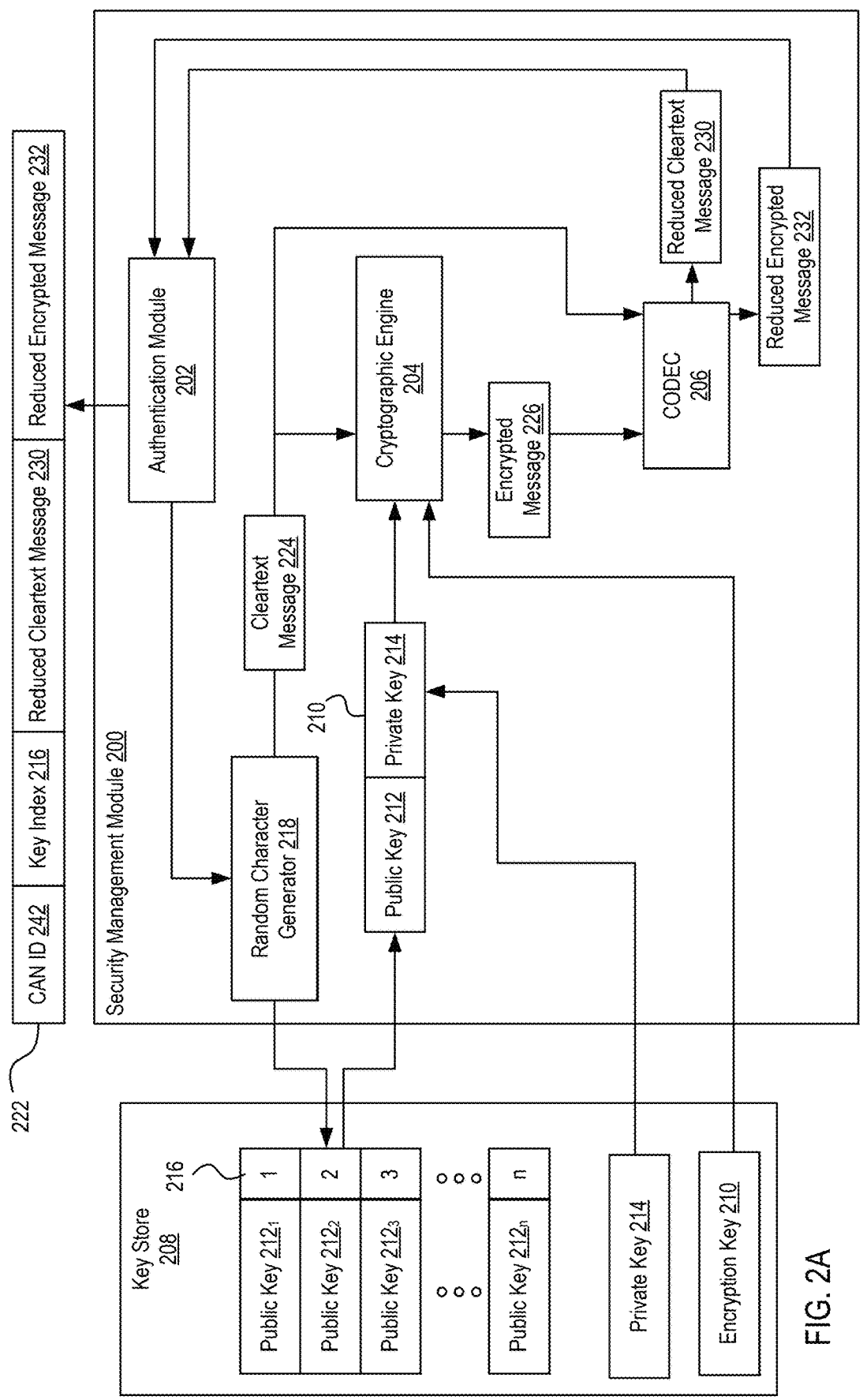
FIG. 2A sets forth a block diagram of an example security management module for cryptographic authentication of components in an electric vessel in accordance with at least one embodiment of the present disclosure.

FIG. 2A sets forth an example security management module 200 for cryptographic authentication of components in an electric vessel in accordance with at least one embodiment of the present disclosure. The security management module 200 may be, for example, the any of the security management modules discussed above with reference to FIGS. 1B-1E. In some examples, the security management module 200 is embodied in a set of computer programing instructions that are stored in a memory (e.g., the storage of FIGS. 1B-1E) that, when executed by a processor, cause the processor to implement the operations described below. In other examples, the security management module 200 may be implemented in digital logic, such as an application specific integrated circuit or programmable logic device.

The security management module 200 of a particular vessel component expects to receive an authentication message from one or more other vessel components. If an expected authentication message is not received, the security management module 200 signals a security error. For example, the list of vessel components for which the authentication message is expected may be stored in a memory device. The list may be a list of CAN identifiers corresponding to the vessel components for which the authentication message is expected. The security management module expects the authentication message at startup or system initialization. Thereafter, the security management module 200 may expect the authentication message based on an authentication schedule, which may be based on a timer. For example, if the security management module 200 does not receive the authentication message by the end of a timeout period since the last authentication message, the security management module 200 may signal a security error. The security management module 200 also authenticates each vessel component for which an authentication message is expected. The authentication of a vessel component is described in more detail below. If authentication of a vessel component fails, the security management module 200 may signal a security error. In response to detecting the security error, the vessel may be disabled. The mechanism for disabling the vessel may depend upon the vessel component that detects the security error, as described below.

In the example of FIG. 2A, the security management module 200 includes a cryptographic engine 204 configured to encrypt and decrypt data. For example, the cryptographic engine 204 can implement the AES128 encryption algorithm to encrypt and decrypt data. It will be appreciated by those of skill in the art that AES128 is discussed as an illustrative example and that a cryptographic engine 204 in accordance with the present disclosure can be implemented using other encryption algorithms and key lengths. For encryption and decryption, the cryptographic engine 204 uses an encryption key 210 stored in a key store 208. The key store 208 is replicated on each genuine component of the vessel. In some examples, an encryption key 210 is produced by concatenating a public key 212 and a private key 214. For example, the public key 212 and the private key 214 are each 64-bit keys. In some implementations, the key store 208 includes multiple public keys $2121\text{-}n$ that are each associated with a key index 216. To produce an encryption key 210, the cryptographic engine 204 selects one of the public keys $2121\text{-}n$ based on the key index 216 (e.g., generated at random or provided in an authentication message, as discussed below), and concatenates the selected public key with the private key to produce a 128-bit encryption key. In some examples, the key store 208 is implemented by a data structure stored a memory device, such as any of the memory devices previously discussed. In some implementations, the private key 214 is stored separately in a secure storage device (not shown). In some examples, the private key 214 is encoded in all genuine components that are produced for the vessel. Thus, the private key 214 is pre-shared among the vessel components. The cryptographic engine 204 encrypts and decrypts messages using the encryption key 210. For example, a 128-bit encryption key is used to encrypt or decrypt a 128-bit message; however, these key lengths and message lengths are provided for illustrative purposes only. It will be appreciated that other key lengths, message lengths, and encryption algorithms may be employed. Additional explanations regarding encryption keys for encryption and decryption by the cryptographic engine 204 is provided below.

In the example of FIG. 2A, the security management module 200 also includes an encoder/decoder ('codec') 206 configured to encode and decode data in accordance with a particular scrambling protocol. For example, to scramble message data, codec 206 selects a subset of bytes of the message, where the byte positions in the data are preconfigured. In one example where 16 bytes of message data are input to the codec 206, the code 206 selects byte 0, byte 7, byte 8, and byte 15 of the data to reduce the 16-byte message to a 4-byte message. To descramble data, codec 206 receives a subset of bytes of a message and reconstructs the message data from the subset of bytes using a descrambling mechanism. For example, knowing a priori the byte positions of the subset of bytes within the message to be decoded, the descrambling mechanism applies a particular order of XOR, SUM, and SHIFT operations to generate the missing bytes and reconstruct the original message data. In one example, codec 206 receives 4 bytes of message data. Knowing that the 4 bytes correspond to byte 0, byte 7, byte 8, and byte 15 and of the original message data, codec 206 applies the XOR, SUM, and SHIFT operations of the descrambling mechanism to generate the missing bytes of the 16-byte message data.

In the example of FIG. 2A, the security management module 200 also includes a random character generator 218. In some examples, the random character generator 218 generates a random number, or random text that is hashed to create a random number, which can be used as a key index 216 to select a public key 212. In some examples, the random character generator 218 can be used to generate cleartext for an authentication message, which is described in more detail below.

In the example of FIG. 2A, the security management module 200 also includes an authentication module 202 configured to generate authentication messages and authenticate vessel components based on received authentication messages. The operation of the security management module 200 to generate an authentication message 222 is now described. In response to a particular trigger (e.g., a timer or the receipt of an authentication message from another vessel component), the authentication module 202 initiates the generation of the authentication message 222 by requesting a random number from the random character generator 218. The authentication module 202 uses the random number as the key index 216 (e.g., '2') to select a public key 212 (e.g., public key 2122) from the key store 208. However, in alternative examples, a timer synchronized to the reception of the last CAN frame can be used to generate a random number. The public key 212 is concatenated with the private key 214 to produce the encryption key 210, which is supplied to the cryptographic engine 204.

The authentication module 202 also requests randomly generated text for a cleartext message 224 (e.g., 16 bytes of clear text) from the random character generator 218. The cleartext message 224 is supplied to the cryptographic engine 204 and to codec 206. The cryptographic engine 204 encrypts the cleartext message 224 using the encryption key 210 to generate an encrypted message 226 (e.g., 16 bytes), which is provided to codec 206. Codec 206 encodes the cleartext message 224 and the encrypted message 226 by reducing the message based on selected byte positions, as discussed above. For example, codec 206 selects byte 0, byte 7, byte 8, and byte 15 of the clear text message 224 to generate a reduced cleartext message 230 (4 bytes) and selects byte 0, byte 7, byte 8, and byte 15 of the encrypted message 226 to generate a reduced encrypted text message 232 (4 bytes). It will be appreciated that the number of bytes and byte positions used to reduce a message are provided for illustrative purposes only.

The authentication module 202 generates the authentication message 222 by constructing a CAN frame that includes the key index 216, the reduced cleartext message 230, and the reduced encrypted message 232. The authentication message 222 is then transmitted over the CAN bus. In some examples, the authentication message 222 also includes an identifier, such as a CAN identifier, of the vessel component transmitting the authentication message 222.

Figure 2B:
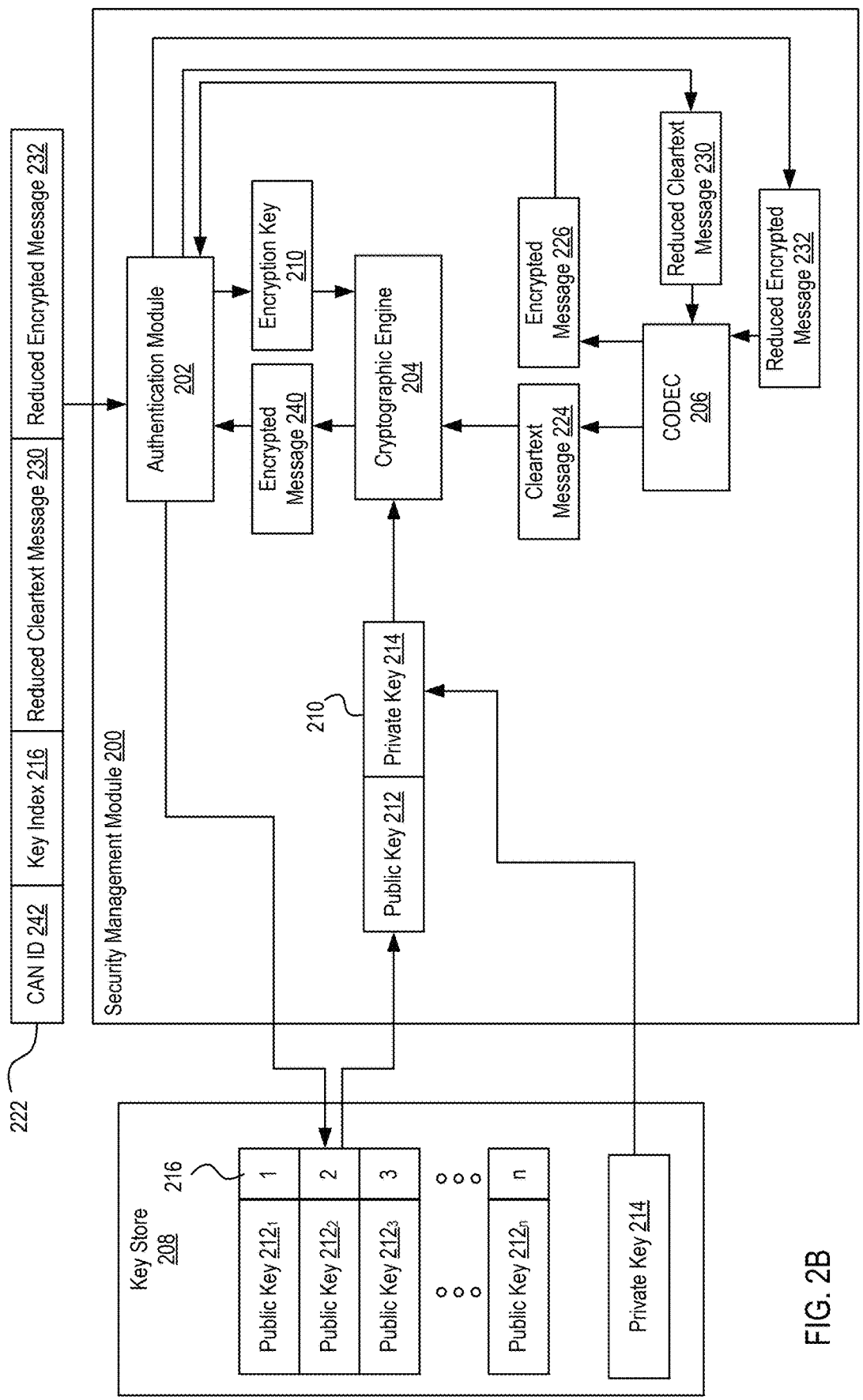
FIG. 2B sets forth another example of the security management module of FIG. 2A.

For further explanation, FIG. 2B illustrates the operation of the security management module 200 to authenticate another vessel component based on an authentication message 222 received from that vessel component. In some examples, the authentication message includes the CAN identifier 242 of the vessel component, a key index 216, the reduced cleartext message 230, and the reduced encrypted message 232. The reduced cleartext message 230 is provided to the codec 206, which reconstructs the cleartext message 224 from the reduced cleartext message 230 based on the known mapping between the bytes of the reduced cleartext message 230 and their byte positions within the clear text message 224, and further by application of the descrambling mechanism to supply the missing bytes. Likewise, the reduced encrypted message 232 is provided to the codec 206, which reconstructs the encrypted message 226 from the reduced encrypted message 232 based on the known mapping between the bytes of the reduced encrypted message 232 and their byte positions within the encrypted message 226, and further by application of the descrambling mechanism to supply the missing bytes.

The key index 216 provided in the authentication message 222 is used to identify a public key 212 from the key store 208. The authentication module 202 concatenates the corresponding public key 212 with the private key 214 to produce the encryption key 210, which is supplied to the cryptographic engine 204. The cleartext message 224 is also supplied to the cryptographic engine 204, which encrypts the cleartext message 224 to generate another encrypted message 240. The authentication module 202 then compares the received encrypted message 226 to the generated encrypted message 240 to determine whether they are identical. If the encrypted message 226 and the encrypted message 240 are identical, the vessel component associated with the CAN identifier 242 in the authentication message 222 is authenticated, in that the security management module 200 determines that the vessel component is a genuine component. If the encrypted message 226 and the encrypted message 240 are not identical, the security management module 200 may signal to a vessel component controller that one or more vessel components have failed authentication, which allows the vessel component controller to perform an error handling action.

Although the authentication protocol described above includes comparing the received encrypted message 226 to the encrypted message 240 generated by encrypting the cleartext message 224, in alternative implementations the authentication module 202 can decrypt the encrypted message 226 to generate cleartext, and compare that cleartext to the cleartext message 224.

Figure 3:
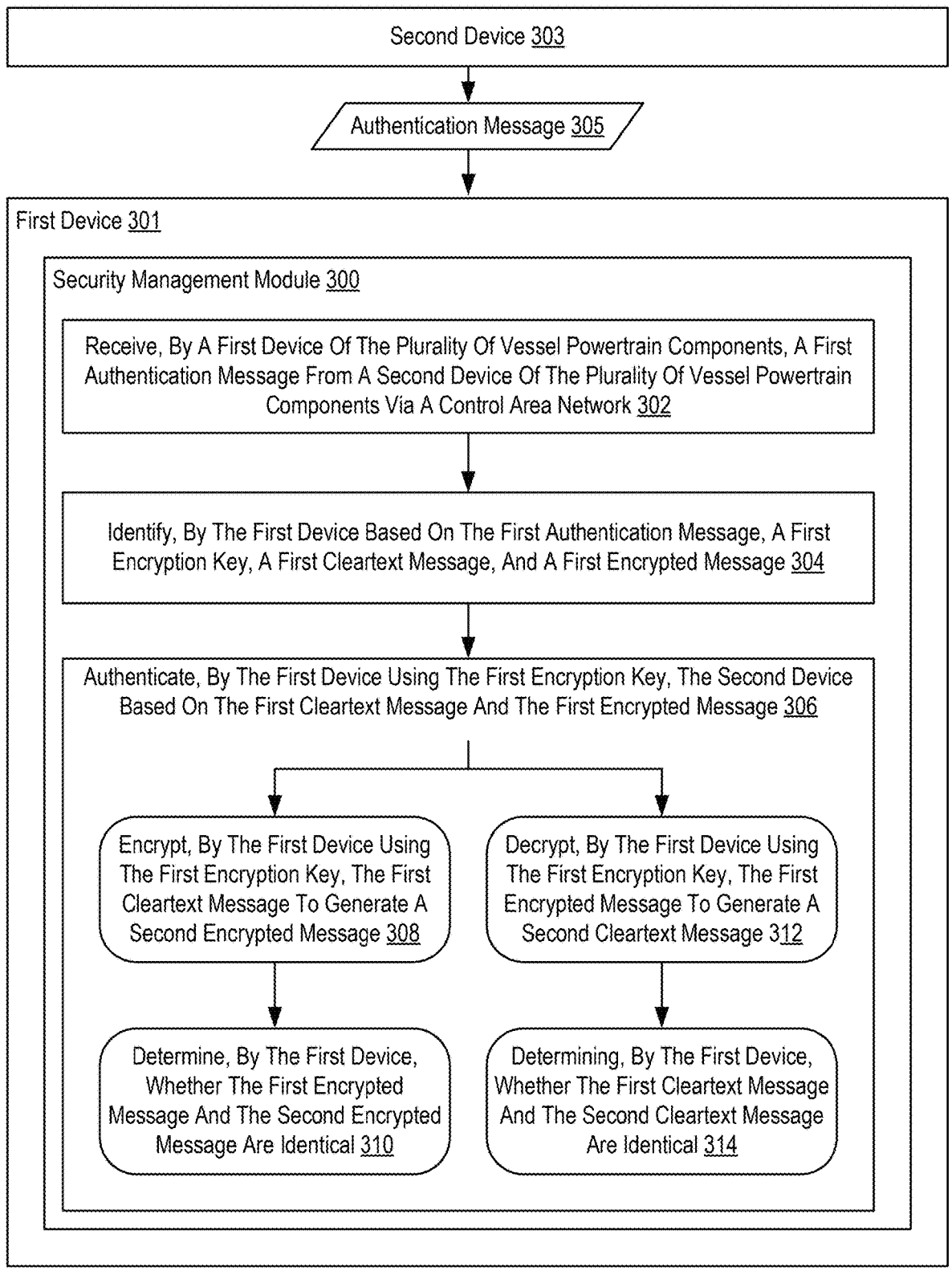
FIG. 3 sets forth a flow chart of an example method for cryptographic authentication of components in an electric vessel in accordance with at least one embodiment of the present disclosure.

For further explanation FIG. 3 sets forth an example method of cryptographic authentication of components in an electric vessel in accordance with at least one embodiment of the present disclosure. The example of FIG. 3 includes a security management module 300, such as the security management module 200 of FIGS. 2A and 2B. The security management module 300 is embodied in a first device 301 that is a vessel component. In particular, the first device 301 may be a vessel powertrain component such a vessel control unit, one or more high voltage battery units, a power distribution unit, and an electric marine propulsion device, or other components described above with reference to FIG. 1A. It will be appreciated that the plurality of vessel powertrain components may include fewer or additional components, as well as components not specifically enumerated in the present disclosure. The first device 301 communicates with at least one second device 303 that is also a vessel component. In particular, the second device 303 may be a vessel powertrain component such a vessel control unit, one or more high voltage battery units, a power distribution unit, and an electric marine propulsion device.

The method of FIG. 3 includes receiving 302, by the first device 301 of the plurality of vessel powertrain components, a first authentication message 305 from the second device 303 of the plurality of vessel powertrain components via a control area network. In some examples, the first device 301 receives 302 the authentication message 305 from the second device 303 as a CAN frame that is transmitted over CAN bus. The authentication message 305 may be received as part of a startup or initialization routine. The authentication message 305 may also be received as part of a periodic exchange in which vessel components generate and transmit authentication messages in accordance with a proscribed time interval. The authentication message 305 may also be received as part of a polling mechanism, in which a device receives an authentication message and is expected to respond with its own authentication message. Authentication messages can be exchanged by some or all of the vessel powertrain component controllers. In a particular example, the first device 301 is a vessel control unit and the second device 303 is a battery management system of a high voltage battery. In another particular example, the first device 301 is a battery management system of a high voltage battery and the second device 303 is a vessel control unit. In some implementations, a particular vessel powertrain component is aware of the other components from which it should expect to receive an authentication message.

The method of FIG. 3 also includes identifying 304, by the first device 301 based on the first authentication message 305, a first encryption key, a first cleartext message, and a first encrypted message. The authentication message accords to a particular structure that is known to the vessel powertrain components. Thus, in some examples, the first device 301 identifies 304 the first encryption key, the first cleartext message, and the first encrypted message by parsing the authentication message 305 in accordance with this structure. For example, a first bit field of the authentication message may indicate the CAN identifier of the sender of the authentication message 305, a second bit field of the authentication message 305 may indicate the length of a payload of the authentication message 305, a third bit field may include the encryption key index, a fourth bit field may include cleartext of a message (i.e., plain text), and a fifth bit field may include ciphertext of the message (i.e., the encrypted cleartext of the message). In some implementations, the authentication message 305 may include the entire cleartext message; however, in other implementations described in more detail below, the authentication message 305 includes only a portion of the cleartext message. In some implementations, the authentication message 305 may include the entire encrypted message; however, in other implementations described in more detail below, the authentication message 305 includes only a portion of the encrypted message. It will be appreciated that using a reduced clear text message and/or reduced encrypted message reduces the size of the payload and increases security.

The method of FIG. 3 also includes authenticating 306, by the first device 301 using an encryption key, the second device 303 based on the first cleartext message and the first encrypted message. In some implementations, the first device 301 authenticates 306 the second device 303 by identifying an encryption key corresponding to an encryption key index included in the authentication message. In some implementations, encryption keys used by the first device 301 and the second device 303 are pre-shared and stored in respective local key stores. Thus, one device can indicate to the other which encryption key was used to generate the encrypted message. In some implementations, the encryption key store includes multiple public keys that are identifiable by the encryption key index. In these implementations, the first device identifies the encryption key corresponding to the encryption key index by concatenating the public key corresponding to the key index with a private key that is also pre-shared between the first device 301 and the second device 303.

In some implementations, the first device 301 authenticates 306 the second device 303 by encrypting 308 the first cleartext message using the encryption key to generate a second encrypted message. For example, the first device 301 may encrypt the first cleartext message using the encryption key and the AES128 encryption algorithm. This generates a test encrypted message that can be validated against the received encrypted message. The first device 301 determines 310 whether the first encrypted message and the second encrypted message are identical. If the two encrypted messages are identical, then it can be known that the second device 303 possesses the private key and thus it can be assumed that the second device 303 is genuine. Accordingly, the second device 303 is authenticated. If the two encrypted messages are not identical, then the encrypted message in the authentication message was not generated using the pre-shared private key, and thus it can be assumed that the second device 303 is not genuine. Thus, the second device 303 is not authenticated.

In other implementations, the first device 301 authenticates 306 the second device 303 by decrypting 312 the first encrypted message using the encryption key to generate a second cleartext message. For example, the first device 301 may decrypt the first encrypted message using the encryption key and the AES128 encryption algorithm. This generates a test cleartext message that can be validated against the received cleartext message. The first device 301 determines 314 whether the first cleartext message and the second cleartext message are identical. If the two cleartext messages are identical, then it can be known that the second device 303 possesses the private key and thus it can be assumed that the second device 303 is genuine. Accordingly, the second device 303 is authenticated. If the two cleartext messages are not identical, then the encrypted message in the authentication message was not generated using the pre-shared private key, and thus it can be assumed that the second device 303 is not genuine. Thus, the second device 303 is not authenticated.

Figure 4:
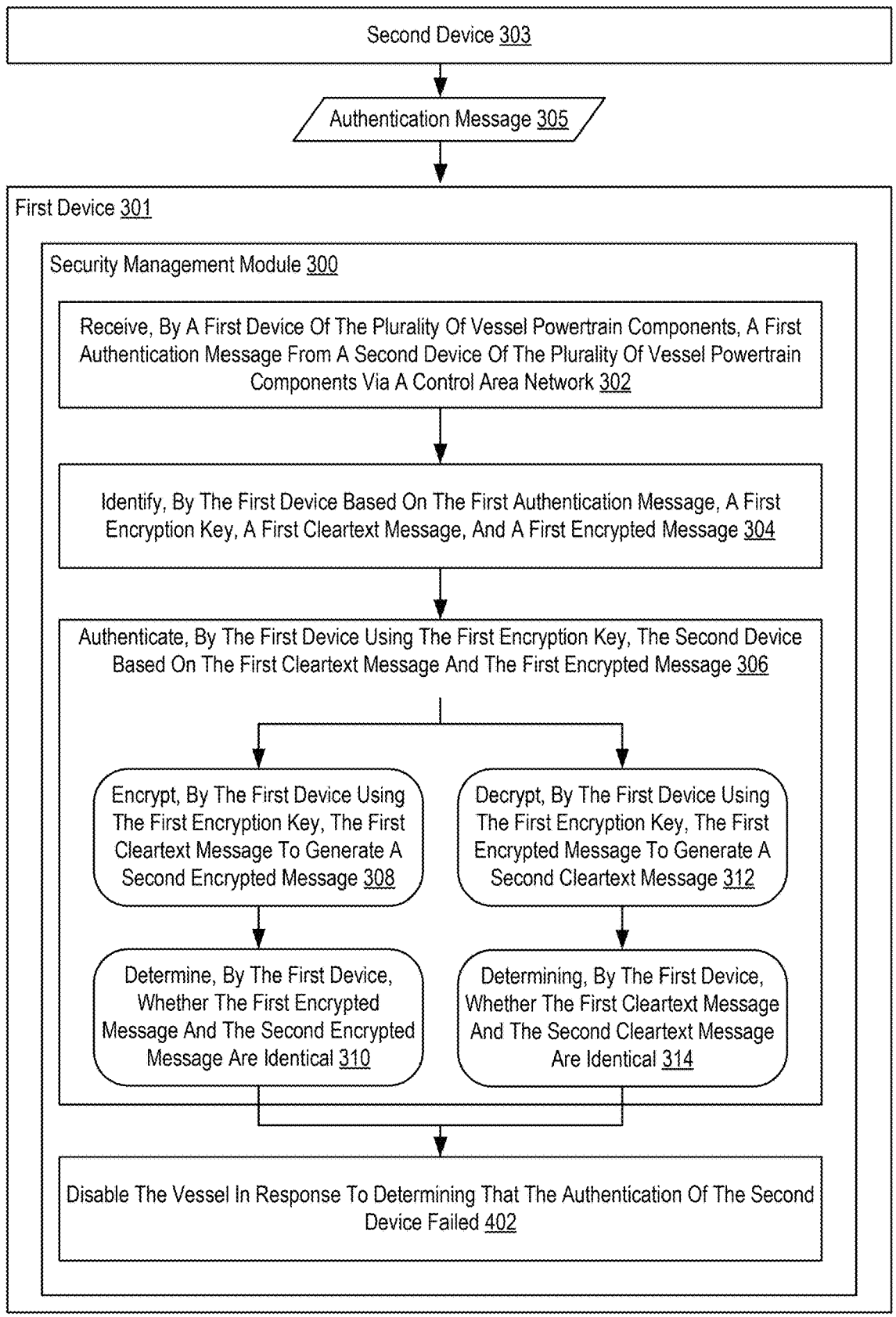
FIG. 4 sets forth a flow chart of another example method for cryptographic authentication of components in an electric vessel in accordance with at least one embodiment of the present disclosure.

For further explanation, FIG. 4 sets forth another example method of cryptographic authentication of components in an electric vessel in accordance with the present disclosure. The method of FIG. 4 extends the method of FIG. 3 in that the method of FIG. 4 further comprises disabling 402 the vessel in response to determining that the authentication of the second device 303 failed. To enhance safety, the first device 301 disables 402 the vessel when the second device 303 is not authenticated by carrying out an error handling action to immobilize the vessel. For example, where the first device 301 is a battery management system of a high voltage battery, the battery management system may disable the vessel by preventing the battery contactors from closing. As another example, where the first device 301 is a vessel control unit, the vessel control unit may disable the vessel by halting commands that are sent over the CAN bus. As yet another example, where the first device is a marine propulsion device, the marine propulsion device may disable the vessel by stopping the motor and/or refusing commands that are issued to it over the CAN bus.

Figure 5:
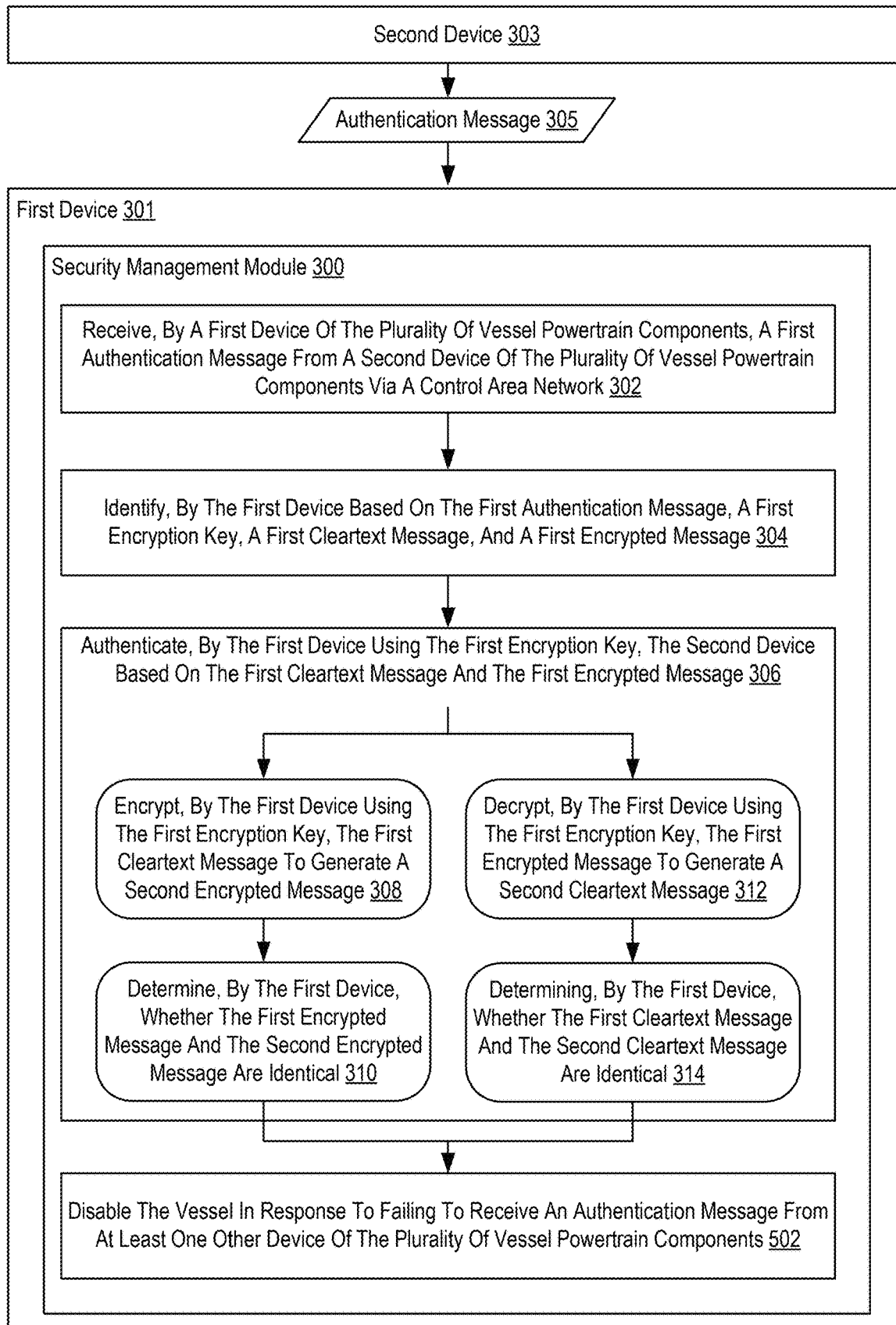
FIG. 5 sets forth a flow chart of another example method for cryptographic authentication of components in an electric vessel in accordance with at least one embodiment of the present disclosure.

For further explanation, FIG. 5 sets forth another example method of cryptographic authentication of components in an electric vessel in accordance with the present disclosure. The method of FIG. 5 extends the method of FIG. 3 in that the method of FIG. 5 further comprises disabling 502 the vessel in response to failing to receive an authentication message from at least one other device of the plurality of vessel powertrain components. In some examples, the first device 301 maintains a list of CAN identifiers corresponding to CAN bus endpoints (i.e., vessel powertrain components) from which it expects to receive an authentication message, and a reporting period for receiving those authentication messages. For example, where the first device is a battery management system, the battery management system may expect to receive authentication messages from a vessel control unit at a particular period interval. When the first device 301 does not receive an authentication message by the end of the reporting window, the first device 301 disables 502 the vessel. For example, assume that a first authentication message is received from the second device 303 at t=0 and that an authentication message must be received every 60 seconds. If the security management module 300 of the first device 301 does not receive a second authentication message from the second device 303 by t=60, the security management module 300 of the first device 301 may signal to a controller of the first device that a security error has occurred, at which point the controller may disable the vessel as discussed above.

Figure 6:
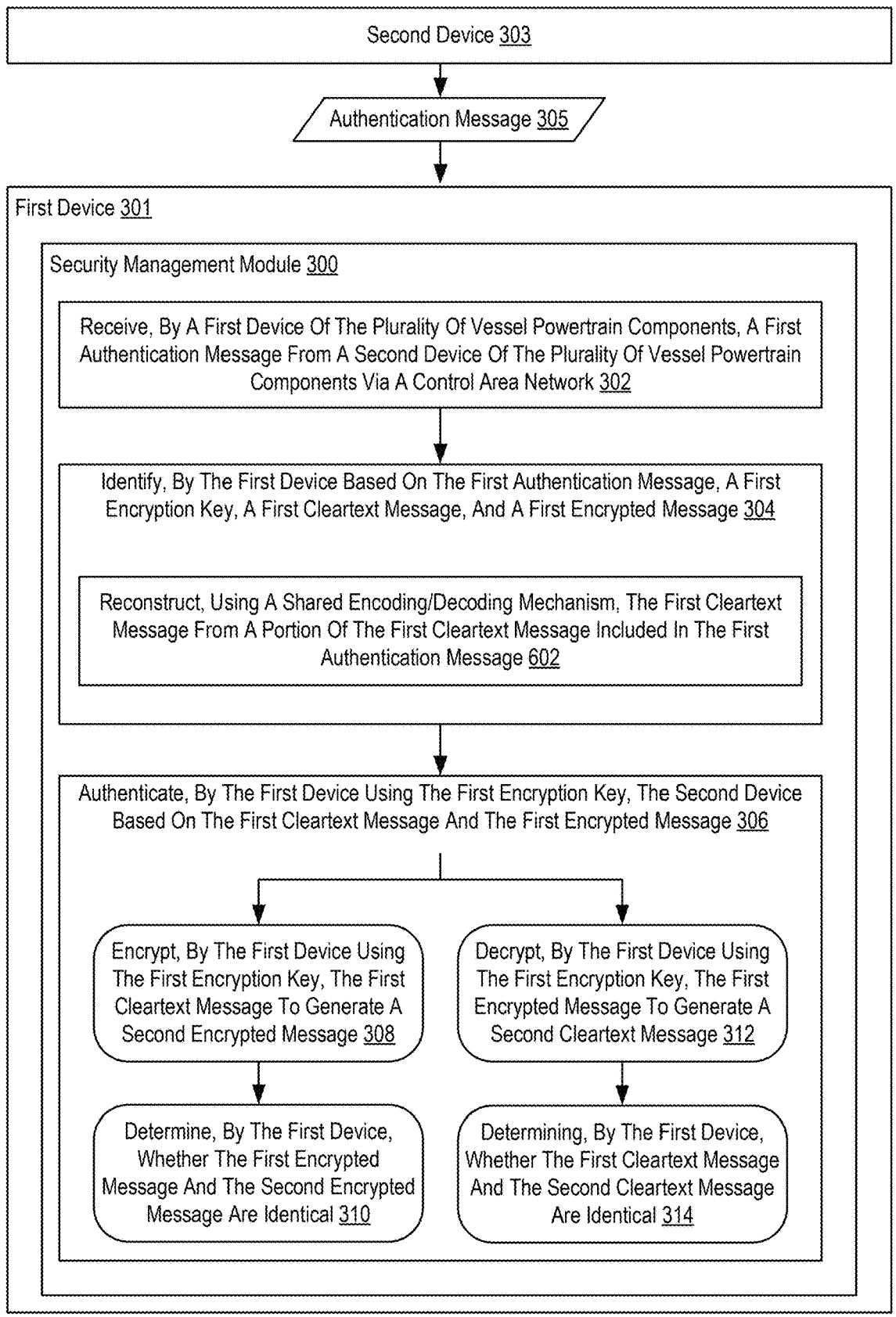
FIG. 6 sets forth a flow chart of another example method for cryptographic authentication of components in an electric vessel in accordance with at least one embodiment of the present disclosure.

As mentioned above, in some implementations the authentication message includes only a portion of the first cleartext message that was used to generate the first authentication message. Thus, the first authentication message includes a reduced cleartext message. For further explanation, FIG. 6 sets forth another example method of cryptographic authentication of components in an electric vessel in accordance with the present disclosure. The method of FIG. 6 extends the method of FIG. 3 in that identifying 304, based on the first authentication message, the first encryption key, the first cleartext message, and the first encrypted message includes reconstructing 602, using a shared encoding/decoding mechanism, the first cleartext message from the portion of the first cleartext message included in the first authentication message. In some examples, the first device 301 reconstructs 602 the first cleartext message from the reduced clear text message based on a known mapping between the bytes of the reduced cleartext message and their byte positions within the original cleartext message, and further by application of a decoding mechanism to supply the missing bytes.

For example, the security module 300 of the first device 301 knows a priori in accordance with an encoding/decoding protocol that an original cleartext message includes a fixed number of bytes and the data in the reduced cleartext message is selected in accordance with predetermined byte positions within the cleartext message. As one example, the security module may know that a cleartext message includes 16 bytes of data and that byte 0, byte 7, byte 8, and byte 15 of the original cleartext message are used to reduce the 16-byte message to a 4-byte message. To descramble the reduced cleartext message, the decoding mechanism applies a particular order of XOR, SUM, and SHIFT operations to generate the missing bytes and reconstruct the original cleartext message.

Figure 7:
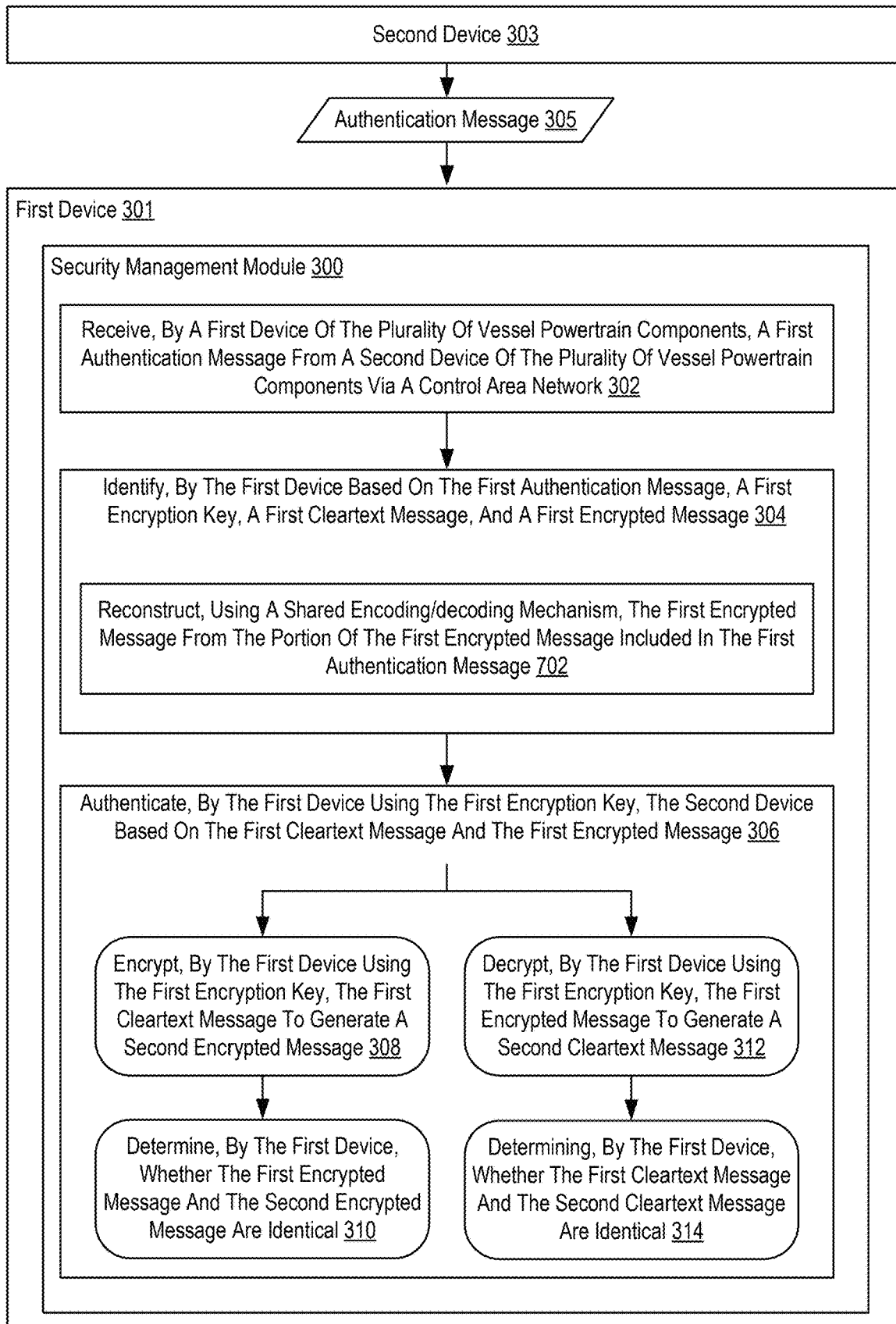
FIG. 7 sets forth a flow chart of another example method for cryptographic authentication of components in an electric vessel in accordance with at least one embodiment of the present disclosure.

As mentioned above, in some implementations the authentication message includes only a portion of the first encrypted message that was used to generate the first authentication message. Thus, the first authentication message includes a reduced encrypted message. For further explanation, FIG. 7 sets forth another example method of cryptographic authentication of components in an electric vessel in accordance with the present disclosure. The method of FIG. 7 extends the method of FIG. 3 in that identifying 304, based on the first authentication message, the first encryption key, the first cleartext message, and the first encrypted message includes reconstructing 702, using a shared encoding/decoding mechanism, the first encrypted message from the portion of the first encrypted message included in the first authentication message. In some examples, the first device 301 reconstructs 702 the first encrypted message from the reduced encrypted message based on a known mapping between the bytes of the reduced encrypted message and their byte positions within the original encrypted message, and further by application of a decoding mechanism to supply the missing bytes.

For example, the security module 300 of the first device 301 knows a priori in accordance with an encoding/decoding protocol that an original encrypted message includes a fixed number of bytes and the data in the reduced encrypted message is selected in accordance with predetermined byte positions within the encrypted message. As one example, the security module may know that an encrypted message includes 16 bytes of data and that byte 0, byte 7, byte 8, and byte 15 of the original encrypted message are used to reduce the 16-byte message to a 4-byte message. To descramble the reduced encrypted message, the decoding mechanism applies a particular order of XOR, SUM, and SHIFT operations to generate the missing bytes and reconstruct the original encrypted message.

Figure 8:
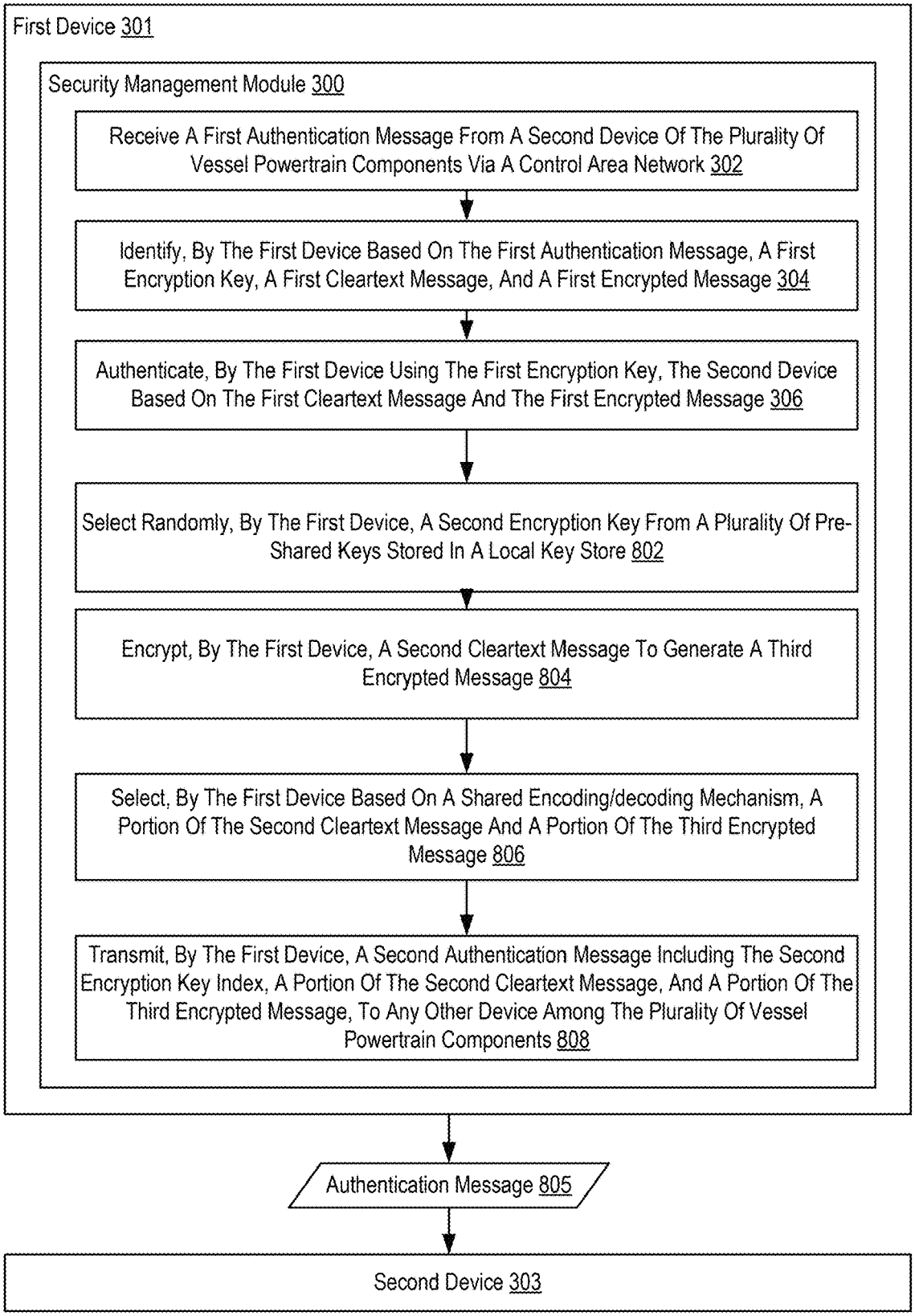
FIG. 8 sets forth a flow chart of another example method for cryptographic authentication of components in an electric vessel in accordance with at least one embodiment of the present disclosure.

For further explanation, FIG. 8 sets forth another example method of cryptographic authentication of components in an electric vessel in accordance with the present disclosure. To allow other devices to authenticate the first device 301, the first device also transmits an authentication message 805. To that end, the method of FIG. 8 extends the method of FIG. 3 in that the method of FIG. 8 further includes selecting 802 randomly, by the first device 301, a second encryption key from a plurality of pre-shared keys stored in a local key store, the second encryption key being associated with a second encryption key index. In some examples, the first device 301 selects 802 the encryption key by generating a random number and using that random number (or a hash of the random number) to index into the local key store. In some examples, the encryption key index corresponds to one of a plurality of public keys in the key store. Once the public key is selected using the randomly generated key index, the selected public key is concatenated with a private key to produce the encryption key.

The method of FIG. 8 also includes encrypting 804, by the first device 301, a second cleartext message to generate a third encrypted message. In some examples, the first device 301 randomly generates a sample of cleartext to use as a cleartext message for the authentication message 805. The first device then encrypts that cleartext message using the encryption key and an encryption algorithm such as AES 128 to generate an encrypted message that is used for the authentication message 805.

The method also includes selecting 806, by the first device 301 based on a shared encoding/decoding mechanism, a portion of the second cleartext message and a portion of the third encrypted message. As discussed above an encoding/decoding mechanism is used to select bytes of particular byte positions of the cleartext message to generate a reduced cleartext message. The encoding/decoding mechanism is used to select bytes of particular byte positions of the encrypted message to generate a reduced encrypted message. For example, where the message length is 16 bytes, the security management module 300 of the first device 301 selects the data of byte 0, byte 7, byte 8, and byte 15 of the original cleartext and encrypted messages to reduce those 16-byte message to a 4-byte message. It will be appreciated that other message sizes, reduced message sizes, and byte position may be employed.

The method of FIG. 8 also includes transmitting 808, by the first device 301, a second authentication message 805 including the second encryption key index, a portion of the second cleartext message, and a portion of the third encrypted message, to any other device among the plurality vessel powertrain components. In some examples, the security management module 300 of the first device composes a CAN frame to include the authentication message 805. For example, a first bit field of the authentication message 805 may indicate the CAN identifier of the first device 301, a second bit field of the authentication message 805 may indicate the length of a payload of the authentication message 805, a third bit field may indicate the encryption key index, a fourth bit field may include the reduced cleartext message, and a fifth bit field may include the reduced encrypted message. The authentication message 805 is then transmitted over the CAN bus to other vessel powertrain components.

In view of the foregoing, it will be appreciated that cryptographic authentication of components in an electric provides a number of advantages, including enhanced safety and security in an electric vessel to prevent damage to the vessel or injury to the operator.

An embodiment of cryptographic authentication of components in an electric vessel includes receiving, by a first device of a plurality of vessel powertrain components, a first authentication message from a second device of the plurality of vessel powertrain components via a control area network. The embodiment also includes identifying, by the first device based on the first authentication message, a first encryption key, a first cleartext message, and a first encrypted message. The embodiment also includes authenticating, by the first device using the first encryption key, the second device based on the first cleartext message and the first encrypted message.

In a variation of the embodiment, authenticating the second device based on the first cleartext message and the first encrypted message using the first encryption key includes encrypting, by the first device using the first encryption key, the first cleartext message to generate a second encrypted message. This variation also includes determining, by the first device, whether the first encrypted message and the second encrypted message are identical.

In another variation of the embodiment, authenticating the second device based on the first cleartext message and the first encrypted message using the first encryption key includes decrypting, by the first device using the first encryption key, the first encrypted message to generate a second cleartext message. This variation also includes determining, by the first device, whether the first cleartext message and the second cleartext message are identical.

Another variation includes disabling the vessel in response to determining that the authentication of the second device failed. Yet another variation includes disabling the vessel in response to failing to receive an authentication message from at least one other device of the plurality of vessel powertrain components.

In another variation of the embodiment, the first authentication message includes an encryption key index, and the encryption key index indicates one of a plurality of pre-shared encryption keys stored in a local key store.

In yet another variation of the embodiment, the first authentication message includes only a portion of the first cleartext message. In this variation, identifying, by the first device based on the first authentication message, a first encryption key, a first cleartext message, and a first encrypted message includes reconstructing, using a shared encoding/decoding mechanism, the first cleartext message from the portion of the first cleartext message included in the first authentication message.

In yet another variation of the embodiment, the first authentication message includes only a portion of the first cleartext message. In this variation, identifying, by the first device based on the first authentication message, a first encryption key, a first cleartext message, and a first encrypted message includes reconstructing, using a shared encoding/decoding mechanism, the first encrypted message from the portion of the first encrypted message included in the first authentication message.

Another variation of the embodiment includes selecting randomly, by the first device, a second encryption key from a plurality of pre-shared keys stored in a local key store, the second encryption key being associated with a second encryption key index. This variation also includes encrypting, by the first device, a second cleartext message to generate a third encrypted message. This variation also includes selecting, by the first device based on a shared encoding/decoding mechanism, a portion of the second cleartext message and a portion of the third encrypted message. This variation further includes transmitting, by the first device, a second authentication message including the second encryption key index, a portion of the second cleartext message, and a portion of the third encrypted message, to any other device among the plurality of vessel powertrain components.

In some examples, two or more the plurality of vessel powertrain components periodically exchange authentication messages. In some examples, the plurality of vessel powertrain components includes a vessel control unit, one or more high voltage battery units, a power distribution unit, and an electric marine propulsion device. In some examples, the first device and the second device are a pair of devices that includes a vessel control unit a battery management system of a high voltage battery unit.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of cryptographic authentication of components in an electric vessel, the electric vessel comprising a plurality of vessel powertrain components, the method comprising:
   receiving, by a first device of the plurality of vessel powertrain components, a first authentication message from a second device of the plurality of vessel powertrain components via a control area network;
   identifying, by the first device based on the first authentication message, a first encryption key, a first cleartext message, and a first encrypted message; and
   authenticating, by the first device using the first encryption key, the second device based on the first cleartext message and the first encrypted message.

2. The method of claim 1, wherein authenticating the second device based on the first cleartext message and the first encrypted message using the first encryption key includes:
   encrypting, by the first device using the first encryption key, the first cleartext message to generate a second encrypted message; and
   determining, by the first device, whether the first encrypted message and the second encrypted message are identical.

3. The method of claim 1, wherein authenticating the second device based on the first cleartext message and the first encrypted message using the first encryption key includes:
   decrypting, by the first device using the first encryption key, the first encrypted message to generate a second cleartext message; and
   determining, by the first device, whether the first cleartext message and the second cleartext message are identical.

4. The method of claim 1 further comprising:
   disabling the vessel in response to determining that the authentication of the second device failed.

5. The method of claim 1 further comprising:
   disabling the vessel in response to failing to receive an authentication message from at least one other device of the plurality of vessel powertrain components.

6. The method of claim 1, wherein the first authentication message includes an encryption key index, and wherein the encryption key index indicates one of a plurality of pre-shared encryption keys stored in a local key store.

7. The method of claim 1, wherein the first authentication message includes only a portion of the first cleartext message; and
   wherein identifying, by the first device based on the first authentication message, a first encryption key, a first cleartext message, and a first encrypted message includes:
   reconstructing, using a shared encoding/decoding mechanism, the first cleartext message from the portion of the first cleartext message included in the first authentication message.

8. The method of claim 1, wherein the first authentication message includes only a portion of the first encrypted message; and
   wherein identifying, by the first device based on the first authentication message, a first encryption key, a first cleartext message, and a first encrypted message includes:
   reconstructing, using a shared encoding/decoding mechanism, the first encrypted message from the portion of the first encrypted message included in the first authentication message.

9. The method of claim 1 further comprising:
   selecting randomly, by the first device, a second encryption key from a plurality of pre-shared keys stored in a local key store, the second encryption key being associated with a second encryption key index;
   encrypting, by the first device, a second cleartext message to generate a third encrypted message;
   selecting, by the first device based on a shared encoding/decoding mechanism, a portion of the second cleartext message and a portion of the third encrypted message; and
   transmitting, by the first device, a second authentication message including the second encryption key index, a portion of the second cleartext message, and a portion of the third encrypted message, to any other device among the plurality of vessel powertrain components.

10. The method of claim 1, wherein two or more of the plurality of vessel powertrain components periodically exchange authentication messages.

11. The method of claim 1, wherein the plurality of vessel powertrain components includes a vessel control unit, one or more high voltage battery units, a power distribution unit, and an electric marine propulsion device.

12. The method of claim 1, wherein the first device and the second device are a pair of devices that includes a vessel control unit a battery management system of a high voltage battery unit.

13. An apparatus for cryptographic authentication of components in an electric vessel, the apparatus comprising:
a processor disposed in a first device of the electric vessel;
a memory storing computer program instruction that, when executed by the processor, cause the processor to:
receive, by the first device of a plurality of vessel powertrain components, a first authentication message from a second device of the plurality of vessel powertrain components via a control area network;
identify, by the first device based on the first authentication message, a first encryption key, a first cleartext message, and a first encrypted message; and
authenticate, by the first device using an encryption key, the second device based on the first cleartext message and the first encrypted message.

14. The apparatus of claim 13, wherein authenticating, by the first device using an encryption key, the second device based on the first cleartext message and the first encrypted message includes one of:
encrypting, using the first encryption key, the first cleartext message to generate a second encrypted message and determining whether the first encrypted message and the second encrypted message are identical; and
decrypting, using the first encryption key, the first encrypted message to generate a second cleartext message and determining whether the first cleartext message and the second cleartext message are identical.

15. The apparatus of claim 13, wherein the computer program instructions, when executed by the processor, cause the processor to:
disable the vessel in response to determining that the authentication of the second device failed.

16. The apparatus of claim 13, wherein the computer program instructions, when executed by the processor, cause the processor to:
disable the vessel in response to failing to receive an authentication message from at least one other device of the plurality of vessel powertrain components.

17. The apparatus of claim 13, wherein the first authentication message includes only a portion of the first encrypted message; and wherein identifying, by the first device based on the first authentication message, a first encryption key, a first cleartext message, and a first encrypted message includes:
reconstructing, using a shared encoding/decoding mechanism, the first cleartext message from the portion of the first cleartext message included in the first authentication message; and
reconstructing, using a shared encoding/decoding mechanism, the first encrypted message from the portion of the first encrypted message included in the first authentication message.

18. The apparatus of claim 13, wherein the computer program instructions, when executed by the processor, cause the processor to:
select randomly, by the first device, a second encryption key from a plurality of pre-shared keys stored in a local key store, the second encryption key being associated with a second encryption key index;
encrypt, by the first device, a second cleartext message to generate a third encrypted message;
select, by the first device based on a shared encoding/decoding mechanism, a portion of the second cleartext message and a portion of the third encrypted message; and
transmit, by the first device, a second authentication message including the second encryption key index, a portion of the second cleartext message, and a portion of the third encrypted message, to any other device among the plurality of vessel powertrain components.

19. The apparatus of claim 13, wherein the second device is a high voltage battery.

20. A computer program product comprising:
a set of one or more computer readable storage media; and
computer program instructions, collectively stored in the set of one or more storage media, that when executed cause a processor to perform computer operations comprising:
receiving, by a first device of a plurality of vessel powertrain components, a first authentication message from a second device of the plurality of vessel powertrain components via a control area network;
identifying, by the first device based on the first authentication message, a first encryption key, a first cleartext message, and a first encrypted message; and
authenticating, by the first device using the first encryption key, the second device based on the first cleartext message and the first encrypted message.

* * * * *